United States Patent
Kawada et al.

(10) Patent No.: US 7,830,997 B2
(45) Date of Patent: Nov. 9, 2010

(54) DIVERSITY RECEIVING DEVICE

(75) Inventors: Tomoharu Kawada, Osaka (JP); Akifumi Nagao, Osaka (JP); Yukiyoshi Nagasawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 854 days.

(21) Appl. No.: 11/606,994

(22) Filed: Dec. 1, 2006

(65) Prior Publication Data

US 2007/0127609 A1 Jun. 7, 2007

(30) Foreign Application Priority Data

Dec. 1, 2005 (JP) ............................. 2005-347976

(51) Int. Cl.
*H04L 1/02* (2006.01)
(52) U.S. Cl. ........................ 375/347; 455/574; 455/133
(58) Field of Classification Search ................. 375/347; 455/574, 133
See application file for complete search history.

(56) References Cited

U.S. PATENT DOCUMENTS

| 5,203,027 | A | * | 4/1993 | Nounin et al. ............... 455/134 |
| 5,541,963 | A |   | 7/1996 | Nakagoshi |
| 5,559,838 | A |   | 9/1996 | Nakagoshi |
| 6,571,090 | B1 | * | 5/2003 | Moriyama et al. ....... 455/277.1 |
| 7,310,503 | B2 |   | 12/2007 | Ido |
| 2005/0070341 | A1 |   | 3/2005 | Umewaka et al. |

FOREIGN PATENT DOCUMENTS

| JP | 06-177805 | 6/1994 |
| JP | 7-38478 A | 2/1995 |
| JP | 2000-183793 | 6/2000 |
| JP | 2001-237731 | 8/2001 |
| JP | 2004-120144 | 4/2004 |
| JP | 2004-328431 | 11/2004 |
| WO | WO 2004/038956 A1 | 5/2004 |

\* cited by examiner

*Primary Examiner*—Shuwang Liu
*Assistant Examiner*—Michael R Neff
(74) *Attorney, Agent, or Firm*—McDermott Will & Emery LLP

(57) ABSTRACT

A diversity receiving device includes a processing circuit in which receiving units, AFC and synchronizing units, and demodulating units for a plurality of systems are connected, received signal intensity detecting units 104 and 105 that detect the intensities of output signals of the respective receiving units so as to output reception intensity detection signals, a control unit that determines to select one system as a synthesis pattern of demodulation signals based on a predetermined judgment criterion according to the respective reception intensity detection signals or to select a plurality of systems so as to add demodulation signals and outputs a plurality of clock interruption control signals requesting the interruption of a clock supply to unselected systems and synthesis pattern selection signals designating a synthesis pattern of demodulation signals of the selected system, a plurality of clock supply units that interrupt the clock supply to the AFC and synchronizing units and the demodulating units of the unselected systems according to the clock interruption control signal, and a synthesizing unit that synthesizes demodulation signals of the selected system according to the synthesis pattern selection signals.

7 Claims, 17 Drawing Sheets

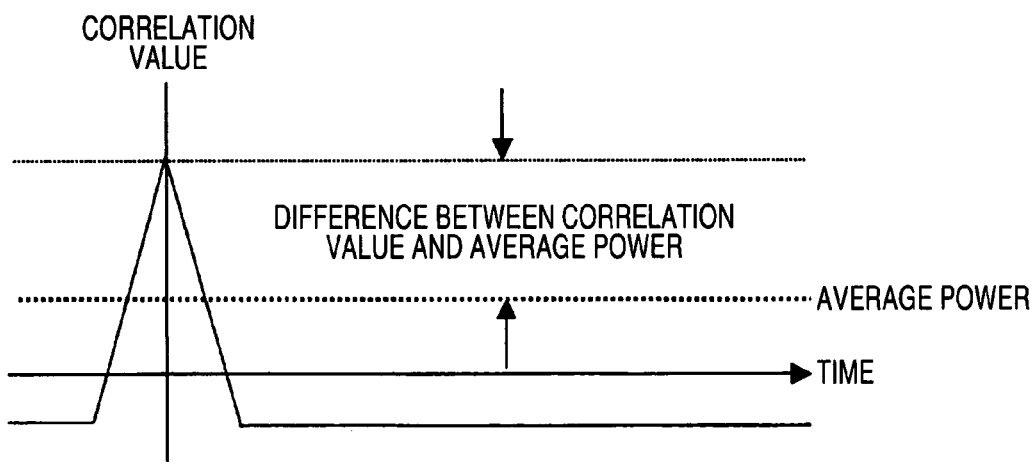
FIG. 9 (a) WAVEFORM OF CORRELATION PEAK BY IDEAL DATA
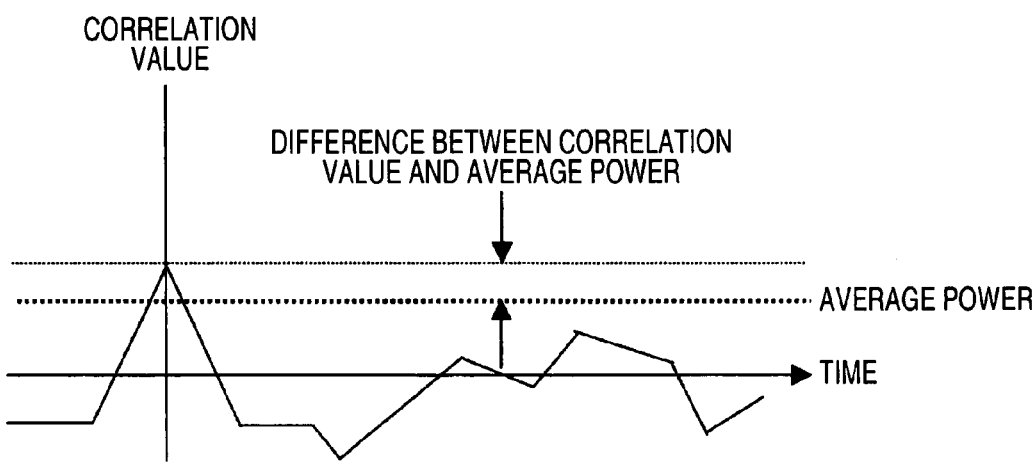
FIG. 9 (b) WAVEFORM OF CORRELATION PEAK BY DATA TO WHICH TRANSMISSION PATH DISTORTION IS ADDED

FIG. 15

| THRESHOLD VALUE COMPARISON RESULT OF RECEPTION INTENSITY SIGNAL S9 | LOW | LOW | HIGH | LOW | HIGH | HIGH |
|---|---|---|---|---|---|---|
| THRESHOLD VALUE COMPARISON RESULT OF RECEPTION INTENSITY SIGNAL S10 | LOW | HIGH | LOW | HIGH | LOW | HIGH |
| THRESHOLD VALUE COMPARISON RESULT OF DIFFERENCE IN RECEPTION INTENSITY \|S9 – S10\| | X | LOW | LOW | HIGH | HIGH | X |
| SELECTION OF SYNTHESIS METHOD | ADDITION SYNTHESIS | ADDITION SYNTHESIS | ADDITION SYNTHESIS | SELECTION SYNTHESIS OF SYSTEM OF HIGH | SELECTION SYNTHESIS OF SYSTEM OF HIGH | SELECTION SYNTHESIS OF SYSTEM WITH LARGE INTENSITY |

FIG. 16

| THRESHOLD VALUE COMPARISON RESULT OF RECEPTION INTENSITY SIGNAL S9 | LOW | LOW | HIGH | LOW | HIGH | HIGH |
|---|---|---|---|---|---|---|
| THRESHOLD VALUE COMPARISON RESULT OF RECEPTION INTENSITY SIGNAL S10 | LOW | HIGH | LOW | HIGH | LOW | HIGH |
| THRESHOLD VALUE COMPARISON RESULT OF DIFFERENCE IN RECEPTION INTENSITY \|S9 − S10\| | × | LOW | LOW | HIGH | HIGH | × |
| SELECTION OF SYNTHESIS METHOD | ADDITION SYNTHESIS | ADDITION SYNTHESIS | ADDITION SYNTHESIS | SELECTION SYNTHESIS OF SYSTEM OF HIGH | SELECTION SYNTHESIS OF SYSTEM OF HIGH | SELECTION SYNTHESIS OF SYSTEM WITH LARGE INTENSITY |

FIG. 17

| | | | | | | | | |
|---|---|---|---|---|---|---|---|---|
| THRESHOLD VALUE COMPARISON RESULT OF RECEPTION INTENSITY SIGNAL S9 | LOW | LOW | HIGH | LOW | HIGH | HIGH | HIGH | HIGH |
| THRESHOLD VALUE COMPARISON RESULT OF RECEPTION INTENSITY SIGNAL S10 | LOW | HIGH | LOW | HIGH | LOW | HIGH | HIGH | HIGH |
| THRESHOLD VALUE COMPARISON RESULT OF DIFFERENCE IN RECEPTION INTENSITY \|S9 − S10\| | X | LOW | LOW | HIGH | HIGH | LOW | LOW | HIGH |
| COMPARISON RESULT BETWEEN CORRELATION DETECTION SIGNAL AND DIFFERENCE IN AVERAGE POWER S24 AND S25 | X | X | X | X | X | S24 > S25 | S24 < S25 | X |
| SELECTION OF SYNTHESIS METHOD | ADDITION SYNTHESIS | ADDITION SYNTHESIS | ADDITION SYNTHESIS | SELECTION SYNTHESIS OF SYSTEM OF HIGH | SELECTION SYNTHESIS OF SYSTEM OF HIGH | SELECT ANTENNA OF SYSTEM OF DIFFERENCE S24 | SELECT ANTENNA OF SYSTEM OF DIFFERENCE S25 | SELECTION SYNTHESIS OF SYSTEM WITH LARGE INTENSITY |

DIVERSITY RECEIVING DEVICE

BACKGROUND OF THE INVENTION

1. Field of the Invention

The present invention relates to a diversity receiving device that selects at least one received signal from a plurality of systems.

2. Description of the Related Art

In the mobile communication, a diversity receiving method that synthesizes received signals of a plurality of antennas or demodulation signals of a plurality of systems is adopted in order to improve the degradation of received signals due to multipath fading. In particular, in a diversity receiving method that synthesizes demodulation signals of a plurality of independent systems, enhancement of reception sensitivity is achieved to the maximum.

FIG. 14 is a block diagram showing the configuration of a known diversity receiving device. Here, two systems are exemplified as a plurality of systems. In FIG. 14, signals S100 and S101 received by antennas 200 and 201 are input to receivers 202 and 203, respectively, such that baseband received signals S102 and S103 are output. The received signals S102 and S103 are input to AFC and synchronizing units 206 and 207, respectively. Received signals S104 and S105 subjected to an AFC (Auto Frequency Control) processing and a symbol synchronization processing in the AFC and synchronizing units 206 and 207 are respectively input to modulating units 208 and 209. The received signals S102 and S103 are respectively input to received signal intensity detecting units 204 and 205, and reception intensity detection signals S109 and S110 output from the received signal intensity detecting units 204 and 205 are respectively input to a comparing unit 211. The demodulation signals S106 and S107 demodulated by the demodulating units 208 and 209 and the output of the comparing unit 211 are input to a synthesizing unit 211. The synthesizing unit 211 outputs a synthesize signal S108 subjected to a synthesis processing according to the output of the comparing unit 211.

With the above-described configuration, when there is a difference in line quality between the plurality of systems, demodulation signals can be synthesized according to the line quality of each system. However, when there is a system in which reception sensitivity is lowered due to fading, such that a signal-to-noise power ratio is degraded, stability of an AFC circuit operation of the system can be lowered, and a diversity gain can be degraded. JP-A-7-38478 discloses a technique that solves the problems using signals of a plurality of systems in common.

In the configuration of the known diversity receiving device, the receiving units 202 and 203, the AFC and synchronizing units 206 and 207, and the demodulating units 208 and 209 independently operates in each system. As a result, although enhancement of reception performance is achieved, power consumption increases because an unselected systems also operate at all times. Further, when there is a system in which reception sensitivity is lowered due to fading, such that a signal-to-noise power ratio is degraded, a more effective measure for enhancing reception performance is desired in order to prevent a diversity gain from being degraded.

An object of the invention is to provide a diversity receiving device that can reduce overall power consumption without degrading reception performance. Another object of the invention is to provide a diversity receiving device that can effectively prevent degradation of a diversity gain when there is a difference in line quality between systems.

According to an aspect of the invention, there is provided a diversity receiving device that selects at least one received signal from a plurality of systems. The diversity receiving device includes a unit that interrupts a power supply to systems other than a selected system. With this configuration, since the power supply to systems other than a selected system is interrupted, it is possible to reduce overall power consumption without degrading reception performance. Specifically, the diversity receiving device may include a plurality of receiving units that respectively receive signals coming into a plurality of antennas, a plurality of AFC and synchronizing units that respectively process the output signals of the receiving units through an AFC processing and a synchronization processing, a plurality of demodulating units that respectively demodulate the output signals of the AFC and synchronizing units so as to output demodulation signals, a plurality of line quality detecting units that respectively detect the intensities of the output signals of the receiving units so as to output reception intensity detection signals, a control unit that determines any one of a selection synthesis diversity for selecting one system and an addition synthesis diversity for selecting a plurality of systems and adding demodulation signals on the basis of a predetermined judgment criteria according to the reception intensity detection signals as a synthesis pattern of the demodulation signals, and outputs clock interruption control signals respectively interrupting the power supply to unselected systems and synthesis pattern selection signals respectively designating a synthesis pattern of demodulation signals of selected systems, a plurality of clock supply units that interrupt a clock supply to the AFC and synchronizing units and the demodulating units of the unselected systems according to the clock interruption control signals, and a synthesizing unit that synthesizes demodulation signals of the selected systems according to the synthesis pattern selection signals.

The diversity receiving device according to the aspect of the invention may further include a unit that synthesizes received signals of the respective systems through a time division processing. With this configuration, the received signals of the respective systems are synthesized through the time division processing, and thus it is possible to reduce the size of a circuit. Specifically, the diversity receiving device may include a plurality of receiving units that respectively receive signals coming into a plurality of antennas, a plurality of AFC and synchronizing units that respectively process the output signals of the receiving units through an AFC processing and a synchronization processing in a time-division manner, a plurality of demodulating units that respectively demodulate the output signals of the AFC and synchronizing units in a time-division manner so as to output the demodulation signals, a plurality of reception intensity detecting units that respectively detect the intensities of the output signals of the receiving units so as to output reception intensity detection signals, a control unit that determines any one of a selection synthesis diversity for selecting one system and an addition synthesis diversity for selecting a plurality of systems and adding demodulation signals on the basis of a predetermined judgment criteria according to the reception intensity detection signals as a synthesis pattern of demodulation signals, performs a control such that unselected systems are not subjected to the time division processing, and outputs clock period control signals designating a clock period of the time division processing according to the number of selected systems and synthesis pattern selection signals designating a synthesis pattern of the demodulated signals of the selected systems, a clock supply unit that supplies a clock of the period designated by the clock period control signal to the AFC and synchronizing units and the demodulating units, and a synthesizing unit that synthesizes demodulation signals of the selected systems according to the synthesis pattern selection signals.

The diversity receiving device according to the aspect of the invention may further include a unit that sends a signal received by an antenna in each system to other systems. With this configuration, a received signal can be sent to an arbitrary system, and thus it is possible to previously determine a system that guides a received signal required for diversity. Accordingly, the power supply to all circuit blocks, excluding the selected systems, can be interrupted. In addition, as the power supply to a receiving circuit that converts a high frequency into a baseband signal is interrupted, it is possible to further reduce power consumption. In general, power consumption of the high frequency may be significant. The diversity receiving device according to the aspect of the invention may include an antenna switching unit that selects one of signals coming into a plurality of antennas so as to output the signal to the receiving unit of the first system. When the selection synthesis diversity is determined as a synthesis pattern of demodulation signals, the control unit requests the antenna switching unit to select a signal coming into the antenna of the system selected on the basis of the judgment criteria. Further, the control unit performs a control such that the first system is set as the selected system and other systems are set as unselected systems, regardless of the judgment criteria, and the clock supply units of the unselected systems interrupt the clock supply to the receiving units of the corresponding systems. When the addition synthesis diversity is determined as a synthesis pattern of demodulation signals, the control unit requests the antenna switching unit to select a signal coming into the antenna of the first system.

The diversity receiving device according to the aspect of the invention may further include a unit that selects a selection synthesis diversity for selecting a received signal with the largest intensity or an addition synthesis diversity for adding all the selected received signals according to the intensity of a received signal. With this configuration, the selection synthesis diversity and the addition synthesis diversity can be switched dynamically according to the intensity of the received signal, and the synthesis pattern is not fixed. Therefore, even though there is a difference in line quality between the systems, it is possible to effectively prevent the degradation of the diversity gain.

The diversity receiving device according to the aspect of the invention may further include a unit that selects the selection synthesis diversity or the addition synthesis diversity according to a difference between a received signal with the largest intensity and a received signal with the second-largest intensity. With this configuration, since the selection synthesis diversity or the addition synthesis diversity is selected in consideration of the difference between the received signal with the greatest intensity and the received signal with the second-greatest intensity, it is possible to effectively prevent the degradation of the diversity gain. In the diversity receiving device according to the aspect of the invention, the predetermined judgment criteria for determining the synthesis pattern of demodulation signals is set to the selection synthesis diversity or the addition synthesis diversity. When the plurality of reception intensity detection signals are equal to or more than a predetermined first threshold value, or when only one of the reception intensity detection signals is equal to or more than the first threshold value and a difference from the reception intensity detection signal having the second-greatest intensity is equal to or more than a second threshold value, the judgment criteria is set to the selection synthesis diversity for selecting the system having the reception intensity detection signal is the greatest. When only one of the reception intensity detection signals is equal to or more than the first threshold value and a difference from the reception intensity detection signal having the second-greatest intensity does not reach the second threshold value, or when any one of the reception intensity detection signals does not reach the first threshold value, the judgment criteria is set to the addition synthesis diversity in which all the systems are selected and the demodulation signals are added.

The diversity receiving device according to the aspect of the invention may further include a unit that selects a received signal of a system in which a difference between a correlation value of received signals and average power of received signals is the largest. With this configuration, since a system having a large difference between the correlation value of received signals and the average power of received signals is selected, it is possible to select a system in which signal distortion is small and a preamble is ideal. In the diversity receiving device, the AFC and synchronizing unit outputs a difference between a correlation detection signal and average power in a corresponding system upon the AFC processing and the synchronization processing. When the plurality of reception intensity detection signals are equal to or more than the first threshold value, a predetermined judgment criterion for determining the synthesis pattern of demodulation signals is set to the selection synthesis diversity for selecting a system in which the difference between the correlation detection signal and the average power is large, instead of a system in which the reception intensity detection signal is the largest.

The diversity receiving device according to the aspect of the invention may further include a unit that selects the selection synthesis diversity or the addition synthesis diversity on the basis of a modulation method of a synthesized received signal. With this configuration, it is possible to select a synthesis pattern according to a modulation method of a received signal. For example, in a multi-valued modulation method, such as 16-QAM or 64-QAM, the addition synthesis diversity that can obtain the significant effect can be selected. Further, in a modulation method, such as BPSK or QPSK, the selection synthesis diversity can be selected. In the diversity receiving device according the aspect of the invention, a predetermined judgment criterion for determining a synthesis pattern of modulation signals is set to the selection synthesis diversity or the addition synthesis diversity so as to correspond to a modulation method of received signals. The control unit selects a synthesis pattern of modulation signals according to a modulation method of received signals detected from the output of a synthesizing unit, regardless of the reception intensity detection signal.

The diversity receiving device according to the aspect of the invention may further include a unit that delays a signal indicating a line quality determined on the basis of the intensity of a received signal by a processing time of each system in synchronization with symbol detection of the received signal, and a unit that selects the selection synthesis diversity or the addition synthesis diversity on the basis of the line quality. With this configuration, since the selection of synthesis pattern can be performed for each symbol, it is possible to reduce power consumption without degrading reception performance, even in a system, such as a high-speed mobile or the like. In the diversity receiving device according to the aspect of the invention, the AFC and synchronizing unit and the demodulating unit delay line quality signals of the respective systems output by the control unit by a processing time in synchronization with the symbol detection performed by the AFC and synchronizing unit and deliver the delayed line quality signals to the next stage. Further, when the line quality signal does not indicate good line quality, the AFC and synchronizing unit and the demodulating unit output a non-selection candidate signal, which sets the corresponding system to an unselected system, to the control unit. The control unit outputs a plurality of line quality signals indicating that line quality is good when the reception intensity detection signals are equal to or more than the first threshold value, and controls an operation timing of a clock supply unit according to the non-selection candidate signal. The synthesizing unit synthesizes the modulation signals of the system selected according to the synthesis pattern selection signal and the line quality signal output by the demodulating unit.

The diversity receiving device according to the aspect of the invention may further include a unit that selects at least one received signal from a plurality of systems on the basis of an instruction from the outside. Further, the diversity receiving device according to the aspect of the invention may further include a unit that selects the selection synthesis diversity or the addition synthesis diversity on the basis of an instruction from the outside.

According to the aspect of the invention of the invention, since the power supply to the systems other than the selected system is interrupted, it is possible to reduce overall power consumption without degrading reception performance.

BRIEF DESCRIPTION OF THE DRAWINGS

FIG. 9 is a waveform view showing the relationship between a correlation value and average power due to a transmission path distortion in the diversity receiving device according to the fifth embodiment of the invention.

FIG. 15 is a diagram showing an example of synthesis pattern selection in the diversity receiving devices according to the first and third embodiment of the invention.

FIG. 16 is a diagram showing an example of synthesis pattern selection in the diversity receiving devices according to the second and fourth embodiments of the invention.

FIG. 17 is a diagram showing an example of synthesis pattern selection in the diversity receiving device according to the fifth embodiment of the invention.

DESCRIPTION OF THE PREFERRED EMBODIMENTS

First Embodiment

Figure 1:
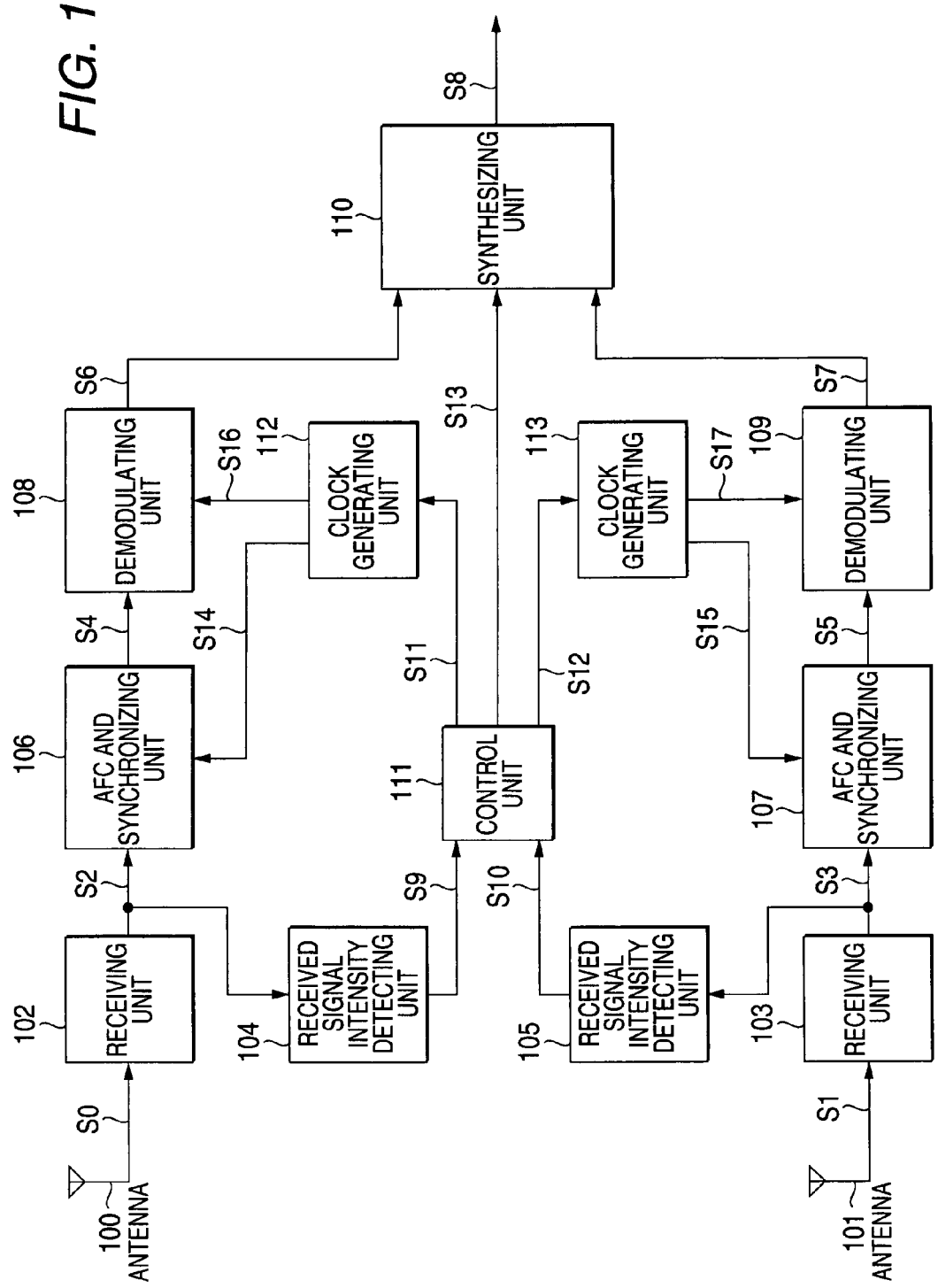
FIG. 1 is a block diagram showing the configuration of a diversity receiving device according to a first embodiment of the invention.

FIG. 1 is a block diagram showing the configuration of a diversity receiving device according to a first embodiment of the invention. In FIG. 1, reference numeral 100 denotes a first antenna, reference numeral 101 denotes a second antenna, reference numeral 102 denotes a receiving unit of a first system, reference numeral 103 denotes a receiving unit of a second system, reference numeral 104 denotes a received signal intensity detecting unit of the first system, reference numeral 105 denotes a received signal intensity detecting unit of the second system, reference numeral 106 denotes an AFC and synchronizing unit of the first system, reference numeral 107 denotes an AFC and synchronizing unit of the second system, reference numeral 108 denotes a demodulating unit of the first system, reference numeral 109 denotes a demodulating unit of the second system, reference numeral 110 denotes a synthesizing unit, reference numeral 111 denotes a control unit, reference numeral 112 denotes a clock generating unit of the first system, and reference numeral 113 denotes a clock generating unit of the second system. Here, two systems are exemplified as a plurality of systems.

In the above configuration, the receiving units 102 and 103 respectively receive signals S0 and S1 coming into the antennas 100 and 101, convert the signals S0 and S1 into baseband signals, and output the converted baseband signals as the received signals S2 and S3. The received signal intensity detecting units 104 and 105 receive received signals S2 and S3, detect the intensities of the received signals, and output reception intensity detection signals S9 and S10, respectively.

The AFC and synchronizing units 106 and 107 receive the received baseband signals S2 and S3 and perform an AFC processing and a symbol synchronization detection so as to output processed received signals S4 and S5. The demodulating units 108 and 109 receive the received signals S4 and S5 subjected to the AFC processing and the symbol synchronization detection processing, and perform demodulation so as to output demodulation signals S6 and S7, respectively.

The control unit 111 receives the reception intensity detection signals S9 and S10, and determines a synthesis pattern of demodulation signals based on a judgment criterion to be described below according to the reception intensity detection signals S9 and S10. Then, the control unit 111 outputs clock interruption control signals S11 and S12, and outputs a synthesis pattern selection signal S13 for selecting a synthesis pattern.

When the clock interruption control signals S11 and S12 are valid, the clock generating units 112 and 113 interrupt clock generation. When the clock interruption control signals S11 and S12 are invalid, the clock generating units 112 and 113 generate clocks so as to output AFC and synchronizing unit clocks S14 and S15 and demodulating unit clocks S16 and S17, respectively.

The synthesizing unit 110 selects a synthesis pattern according to the input synthesis pattern selection signal S13 and synthesizes the demodulation signals S6 and S7 so as to output a synthesized demodulation signal S8. Here, as a synthesis pattern, any one of selection synthesis diversity and addition synthesis diversity is selected. In the selection synthesis diversity, one of the demodulation signals S6 and S7 is selected. In the addition synthesis diversity, the demodulation signals S6 and S7 are added. In general, the addition synthesis diversity has reception performance superior to the selection synthesis diversity.

Hereinafter, the operations of the respective units will be described in detail. In the control unit 111, a first threshold value for comparison with the reception intensity detection signals S9 and S10 and a second threshold for comparison with a difference between the reception intensity detection signals S9 and S10 can be set to arbitrary values. The first threshold value is set to a value having reception intensity at which reception can be performed according to a system.

FIG. 15 shows examples of synthesis pattern selection performed depending on the comparison result of the reception intensity detection signals S9 and S10 with respect to the first threshold value and the comparison result of the difference between the reception intensity detection signals S9 and S10 with respect to the second threshold value.

When both the reception intensity detection signals S9 and S10 do not exceed the first threshold value, the reception intensity is judged to be reception intensity at which reception is rarely performed, regardless of the comparison result of the difference between the reception intensity detection signals S9 and S10 with respect to the second threshold value. In this case, the addition synthesis of the demodulation signals S6 and S7 of two systems is performed as synthesis pattern selection, thereby enhancing reception performance.

Accordingly, the clock interruption control signals S11 and S12 are invalidated for the AFC and synchronizing units 106 and 107 and the demodulation units 108 and 109 of two independent systems, such that the clock generating units 112 and 113 generate a clock.

When only one of the reception intensity detection signals S9 and S10 exceeds the first threshold value, and when the difference between the reception intensity detection signals S9 and S10 does not exceed the second threshold value, the reception intensity detection signal of the system exceeding the threshold value is judged to have signal intensity at which reception is rarely performed around the limit of reception intensity where reception can be performed. In this case, the addition synthesis of the demodulation signals S6 and S7 of two systems is performed as synthesis pattern selection, thereby enhancing reception performance.

Accordingly, the clock interruption control signals S11 and S12 are invalidated for the AFC and synchronizing units 106 and 107 and the demodulation units 108 and 109 of two independent systems, such that the clock generating units 112 and 113 generate a clock.

When only one of the reception intensity detection signals S9 and S10 exceeds the first threshold value, and when the difference between the reception intensity detection signals S9 and S10 exceeds the second threshold value, the reception intensity of the system exceeding the threshold value is judged as reception intensity at which reception can be performed. In this case, the selection synthesis of the received signal of the system exceeding the first threshold value is performed as synthesis pattern selection.

Accordingly, if the reception intensity detection signal S9 exceeds the first threshold value, the clock interruption control signal S11 is invalidated for the AFC and synchronizing unit 106 and the demodulating unit 108 of the system detecting the reception intensity detection signal S9, and the clock interruption control signal S12 is validated for the AFC and synchronizing unit 107 and the demodulation unit 109 of the system detecting the reception intensity detection signal S10 not exceeding the first threshold value. Then, the clock generation in the clock generating unit 112 is performed, and the clock generation in the clock generating unit 113 is interrupted. Therefore, it is possible to reduce power consumption without degrading reception performance.

When both the reception intensity detection signals S9 and S10 exceed the first threshold value, the reception intensity is judged as reception intensity at which the reception can be performed for both systems, regardless of the comparison result of the difference between the reception intensity detection signals S9 and S10 with respect to the second threshold value. In this case, the selection synthesis where the system having larger reception intensity is selected is performed as synthesis pattern selection.

For example, when the reception intensity detection signal S9 is larger in reception intensity than the reception detection signal S10, the clock interruption control signal S11 is invalidated for the AFC and synchronizing unit 106 and the demodulating unit 108 of the system detecting the reception intensity detection signal S9, and the clock interruption control signal S12 is validated for the AFC and synchronizing unit 107 and the demodulating unit 109 of the system detecting the reception intensity detection signal S10. Then, the clock generation in the clock generating unit 112 is performed, and the clock generation in the clock generating unit 113 is interrupted. Therefore, it is possible to reduce power consumption without degrading reception performance.

As described above, the clock generation control and the synthesis pattern selection of the respective systems are performed according to the reception intensity detection signals of the systems and the difference between the reception intensity detection signals, which makes it possible to reduce power consumption without degrading reception performance.

The clock control and the selection of synthesis pattern may be performed by only the reception intensity detection signals. Further, the threshold value can be set to a plurality of levels depending on the reception intensity. Then, when the reception intensity detection signal exceeds the threshold value at a level where the reception intensity is weak, the demodulation signals of a plurality of systems exceeding the threshold value may be added and synthesized. The same is applied to the following embodiments.

Second Embodiment

Figure 2:
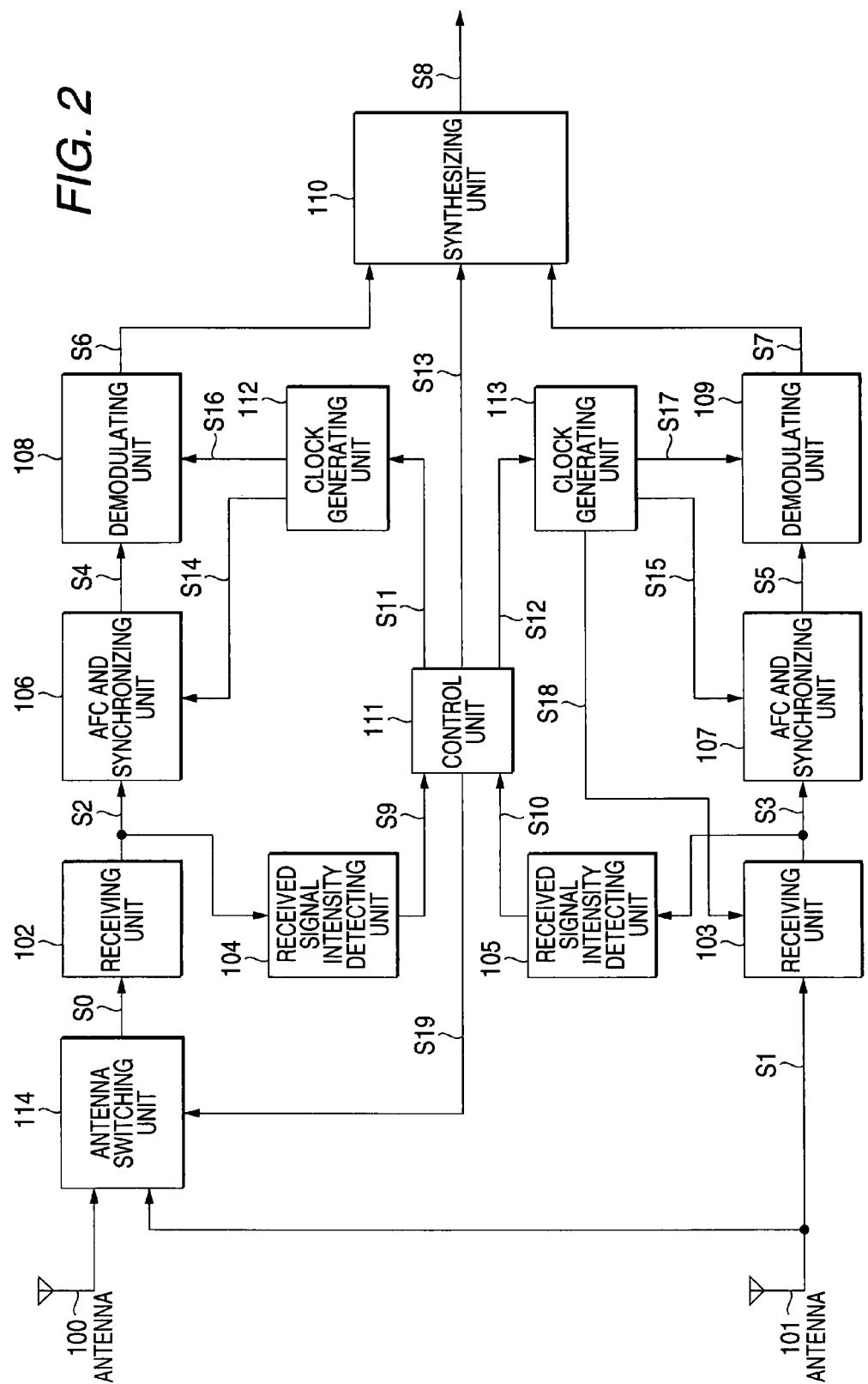
FIG. 2 is a block diagram showing the configuration of a diversity receiving device according to a second embodiment of the invention.

FIG. 2 is a block diagram showing the configuration of a diversity receiving device according to a second embodiment of the invention. In FIG. 2, an antenna switching unit 114 is added to the configuration of the first embodiment shown in FIG. 1. Hereinafter, a difference from the first embodiment will be described.

The antenna switching unit 114 selects one of signals coming into two of the antennas 100 and 101 on the basis of an antenna selection signal S19, and outputs the signal as a received signal S0 to the receiving unit 102. A diversity method using such an antenna switching unit is referred to as an antenna selection synthesis diversity.

The control unit 111 receives the reception intensity detection signals S9 and S10 and outputs clock interruption control signals S11 and S12 according to the reception intensity detection signals S9 and S10. Further, the control unit 111 outputs a synthesis pattern selection signal S13 for selecting a synthesis pattern and an antenna selection signal S19.

When the clock interruption control signal S12 is valid, the clock generating unit 113 interrupts the clock generation. When the clock interruption control signal S12 is invalid, the clock generating unit 113 generates a clock. Then, the supply of receiving unit clock S18 is interrupted, in addition to an AFC and synchronizing unit clock S15 and a demodulating unit clock S17. Except for the above-described configuration, the configuration of the second embodiment is the same as the first embodiment.

In the reception performance of the diversity method using the antenna switching unit, the addition synthesis diversity has a property superior to the selection synthesis diversity, and both have a property superior to the antenna selection synthesis diversity.

Hereinafter, the operations of the respective units will be described in detail. When the reception operation is initiated, the antenna switching unit 114 is set to select the antenna 100 at all times. Further, the receiving unit 102 converts the signal S0 received in the antenna 100 into a baseband received signal S2 and outputs the converted signal. In addition, the receiving unit 103 converts the signal S1 received in the antenna 101 into a baseband received signal S3 and outputs the converted signal.

In the control unit 111, a first threshold value for comparison with the reception intensity detection signals S9 and S10 and a second threshold value for comparison with a difference between the reception intensity detection signals S9 and S10 can be set to arbitrary values, like the first embodiment. The first threshold value is set to a value having reception intensity at which reception can be performed according to a system.

FIG. 16 shows examples of synthesis pattern selection to be performed by the comparison result of the reception intensity detection signal S9 and S10 with respect to the first threshold value and the comparison result of the difference between the reception intensity detection signal S9 and S10 with respect to the second threshold value. Except for the case where both of the reception intensity detection signals S9 and S10 exceed the first threshold value, the selection operation of synthesis pattern to be performed is the same as that of the first embodiment.

When both the reception intensity detection signals S9 and S10 exceed the first threshold value, the reception intensity is judged as reception intensity at which reception can be performed by two systems, regardless of the comparison result of the difference between the reception intensity detection signals S9 and S10 with respect to the second threshold value. Further, the antennas are switched over by the antenna switching unit 14 such that the antenna selection synthesis diversity is set.

At this time, the control unit 111 controls the antenna switching unit 114 such that the system having larger reception intensity is selected by the antenna selection signal S19. Further, the control unit 111 performs a selection synthesis in which the demodulation signal S6 output from the demodulating unit 108 is always selected as synthesis pattern selection.

For example, when the reception intensity detection signal S10 is larger than the reception intensity detection signal S9, the control unit 111 controls the antenna switching unit 114 such that the antenna 101 of the system detecting the reception intensity detection signal S10 is selected by the antenna selection signal S19. Further, the clock interruption control signal S11 is invalidated for the AFC and synchronizing unit 106 and the demodulating unit 108, and the clock interruption control signal S12 is validated for the receiving unit 103, the AFC and synchronizing unit 107, and the demodulating unit 109. Then, the clock generation in the clock generating unit 112 is performed, and the generation of the receiving unit clock S18, the AFC and synchronizing unit clock S15, and the demodulating unit clock S17 in the clock generating unit 113 is interrupted.

Accordingly, the clock of the receiving unit having high power consumption in a wireless system to be converted from a high frequency into a baseband signal can be interrupted. Then, it is possible to further reduce power consumption without degrading reception performance.

After the antenna selection synthesis diversity is selected, the detection of reception intensity is performed as follows. First, the antenna 100 is selected by the antenna selection signal S19 in the antenna switching unit 114. Then, the received signal intensity detecting unit 104 detects the intensity of the received signal S2 output from the receiving unit 102 and outputs the detection signal as the reception intensity detection signal S9 of the signal received by the antenna 100.

Next, the antenna 101 is selected by the antenna selection signal S19 in the antenna switching unit 114, and the received signal intensity detecting unit 104 detects the intensity of the received signal S2 output from the receiving unit 102 and outputs the detection signal as the reception intensity detection signal S9 of the signal received by the antenna 101. Then, two reception intensity detection signals of the antennas 100 and 101 are serially detected.

As described above, the clock generation control and the synthesis pattern selection of the respective systems are performed according to the reception intensity detection signals of the systems and the difference between the reception intensity detection signals. As a result, it is possible to reduce power consumption without degrading reception performance.

Third Embodiment

Figure 3:
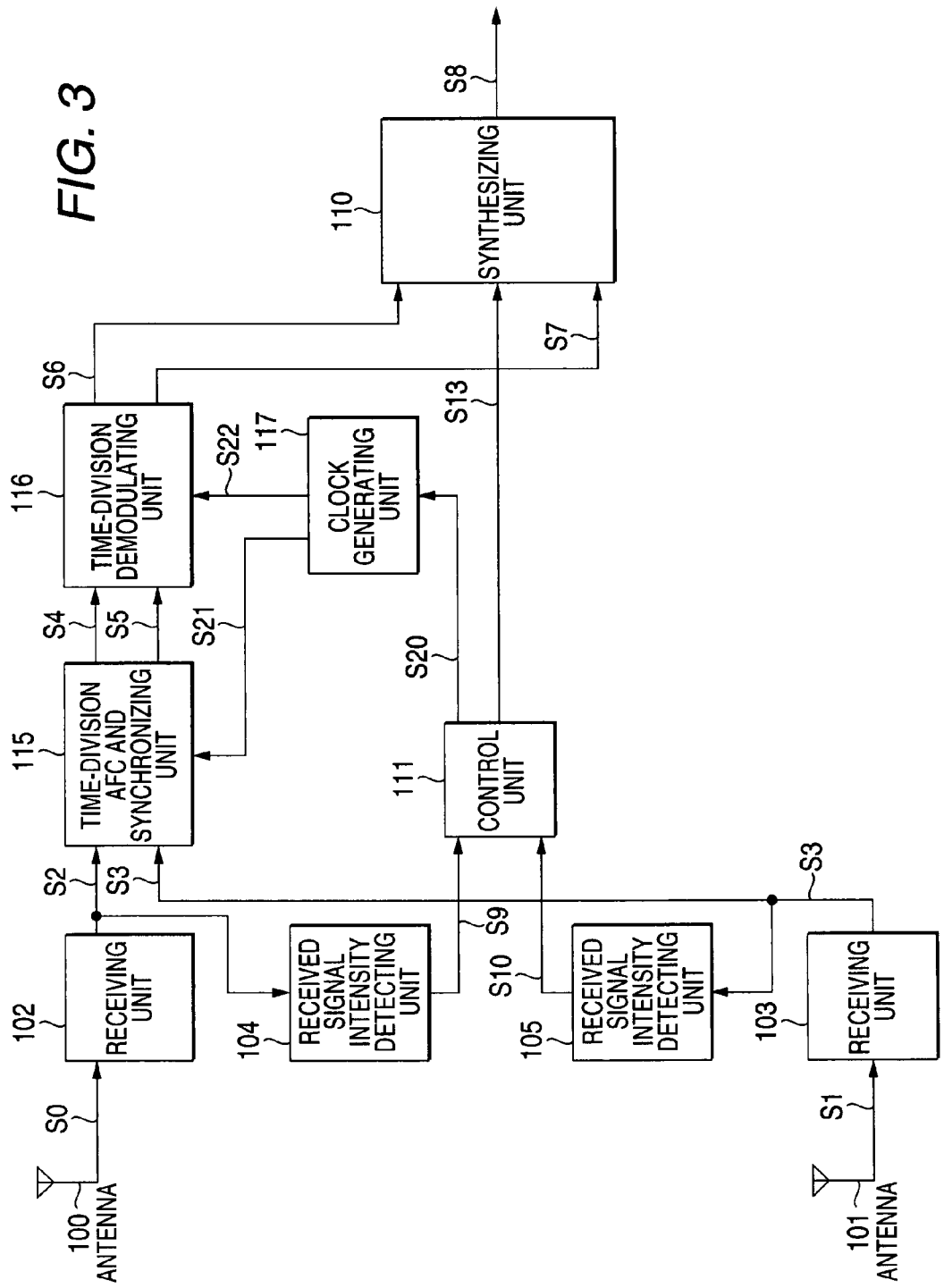
FIG. 3 is a block diagram showing the configuration of a diversity receiving device according to a third embodiment of the invention.

FIG. 3 is a block diagram showing the configuration of a diversity receiving device according to a third embodiment of the invention. In FIG. 3, reference numeral 100 denotes a first antenna, reference numeral 101 denotes a second antenna, reference numeral 102 denotes a receiving unit of a first system, reference numeral 103 denotes a receiving unit of a second system, reference numeral 104 denotes a received signal intensity detecting unit of the first system, reference numerals 105 denotes a received signal intensity detecting unit of the second system, reference numeral 115 denotes an AFC and synchronizing unit which performs time-division processing, reference numeral 116 denotes a demodulating unit which performs time-division processing, reference numeral 110 denotes a synthesizing unit, reference numeral 111 denotes a control unit, and reference numeral 117 denotes a clock generating unit. Here, two systems are exemplified as a plurality of systems.

The time-division processing is defined as follows. When a clock frequency of 20 MHz is required in processing of one system, an arithmetic processing system is shared using a clock frequency of 40 MHz such that the capacity of a memory (a unit for holding data) is doubled. Then, a processing corresponding to two systems is performed by one system. In general, the circuit size of one system having an AFC and synchronizing unit and a demodulating unit capable of performing a time-division processing is smaller than that when each of two independent systems has an AFC and synchronizing unit and a demodulating unit.

In the above-described configuration, the receiving units 102 and 103 receive signals S0 and S1 coming into the antennas 100 and 101, convert the signals into baseband received signals, and output the converted signals as received signals S2 and S3, respectively. The received signal intensity detecting units 104 and 105 receive the received signals S2 and S3, detect the intensities of the received signals, and output reception intensity detection signals S9 and S10, respectively.

The AFC and synchronizing unit 115 receives the received baseband signals S2 and S3 so as to perform an AFC processing and a symbol synchronization detection processing in a time division manner and outputs the processed received signals S4 and S5. The demodulating unit 116 receives the received signals S4 and S5 so as to perform demodulation in a time division manner and outputs the processed demodulation signals S6 and S7.

The control unit 111 receives the reception intensity detection signals S9 and S10, determines a synthesis pattern of demodulation signals on the basis of a judgment criterion described according to the reception intensity detection signals S9 and S10, and outputs a clock period control signal S20 and a synthesis pattern selection signal S13 as synthesis pattern selection.

The clock generating unit 117 switches a clock period according to the clock period control signal S20 and outputs an AFC and synchronizing unit clock S21 and a demodulating unit clock S22.

The synthesizing unit 110 selects a synthesis pattern according to the input synthesis pattern selection signal S13 and synthesizes the demodulation signals S6 and S7 so as to output a synthesized demodulation signal S8. Here, any one of the selection synthesis diversity for selecting one of the demodulation signals S6 and S7 and the addition synthesis diversity for adding the demodulation signals S6 and S7 is selected as a synthesis pattern.

In this embodiment, the AFC and synchronizing unit 115 performing a time-division processing and the demodulating unit 116 performing a time-division processing are set to operate at 20 MHz when the processing of one system is performed at 40 MHz and when the processing corresponding to two systems is processed in a time-division manner.

Hereinafter, the operations of the respective units will be described in detail. In the control unit 111, a first threshold value for comparison with the reception intensity detection signals S9 and S10 and a second threshold value for comparison with a difference between the reception intensity detection signals S9 and S10 can be set to arbitrary values, like the first embodiment. The first threshold value is set to a value having reception intensity at which reception can be performed according to a system.

FIG. 15 shows examples of synthesis pattern selection to be performed by the comparison result of the reception intensity detection signal S9 and S10 with respect to the first threshold value and the comparison result of the difference between the reception intensity detection signals S9 and S10 with respect to the second threshold value, like the first embodiment.

When both the reception intensity detection signals S9 and S10 do not exceed the first threshold value, the reception intensity is judged as intensity at which reception is rarely performed, regardless of the comparison result of the difference between the reception intensity detection signals S9 and S10 with respect to the second threshold value. In this case, the addition synthesis of the demodulation signals S6 and S7 of two systems is performed as synthesis pattern selection, thereby enhancing reception performance.

Accordingly, the clock period control signal S20 of the AFC and synchronizing unit 115 performing the time division processing and the demodulating unit 116 performing the time division processing is controlled to be set to 40 MHz, and the clock generating unit 117 generates a clock of 40 MHz.

When only one of the reception intensity detection signals S9 and S10 exceeds the first threshold value, and when the difference between the reception intensity detection signals S9 and S10 does not exceed the second threshold value, the reception intensity detection signal of the system exceeding the threshold value is also judged to have reception intensity at which reception is rarely performed around the limit of reception intensity where reception can be performed. In this case, the addition synthesis of the demodulation signals S6 and S7 of two systems is performed as synthesis pattern selection, thereby enhancing reception performance.

Accordingly, the clock period control signal S20 of the AFC and synchronizing unit 115 performing the time division processing and the demodulating unit 116 performing the time division processing is controlled to be set at 40 MHz, and the clock generating unit 117 generates a clock of 40 MHz.

When only one of the reception intensity detection signals S9 and S10 exceeds the first threshold value, and when the difference between the reception intensity detection signals S9 and S10 exceeds the second threshold value, the received signal intensity of the system exceeding the threshold value is judged as signal intensity at which reception can be sufficiently performed. In this case, the selection synthesis of the received signal of the system exceeding the first threshold value is performed as synthesis pattern selection.

Accordingly, if the reception intensity detection signal S9 exceeds the threshold value, the clock period control signal S20 of the AFC and synchronizing unit 115 and the demodulating unit 116 is controlled so as to be set at 20 MHz. Then, the processing of the system detecting the reception intensity detection signal S9 is performed, and the clock generating unit 117 generates a clock of 20 MHz. Therefore, it is possible to reduce power consumption without degrading reception performance.

When both the reception intensity detection signals S9 and S10 exceed the first threshold value, the reception intensity is judged as reception intensity at which reception can be performed by two systems, regardless of the comparison result of the difference between the reception intensity detection signals S9 and S10 with respect to the second threshold value. In this case, as synthesis pattern selection, the selection synthesis for selecting the system having larger reception intensity is performed.

For example, when the reception intensity detection signal S9 is larger than the reception intensity detection signal S10, the clock period control signal S20 of the AFC and synchronizing unit 115 and the demodulating unit 116 is controlled so as to be set at 20 MHz. Accordingly, the processing of the system detecting the reception intensity detection signal S9 is performed, and the clock generating unit 117 generates a clock of 20 MHz. Therefore, it is possible to reduce power consumption without degrading reception performance.

As described above, the clock generation control and the synthesis pattern selection of the respective systems are performed according to the reception intensity detection signals of the systems and the difference between the reception inten-

Fourth Embodiment

Figure 4:
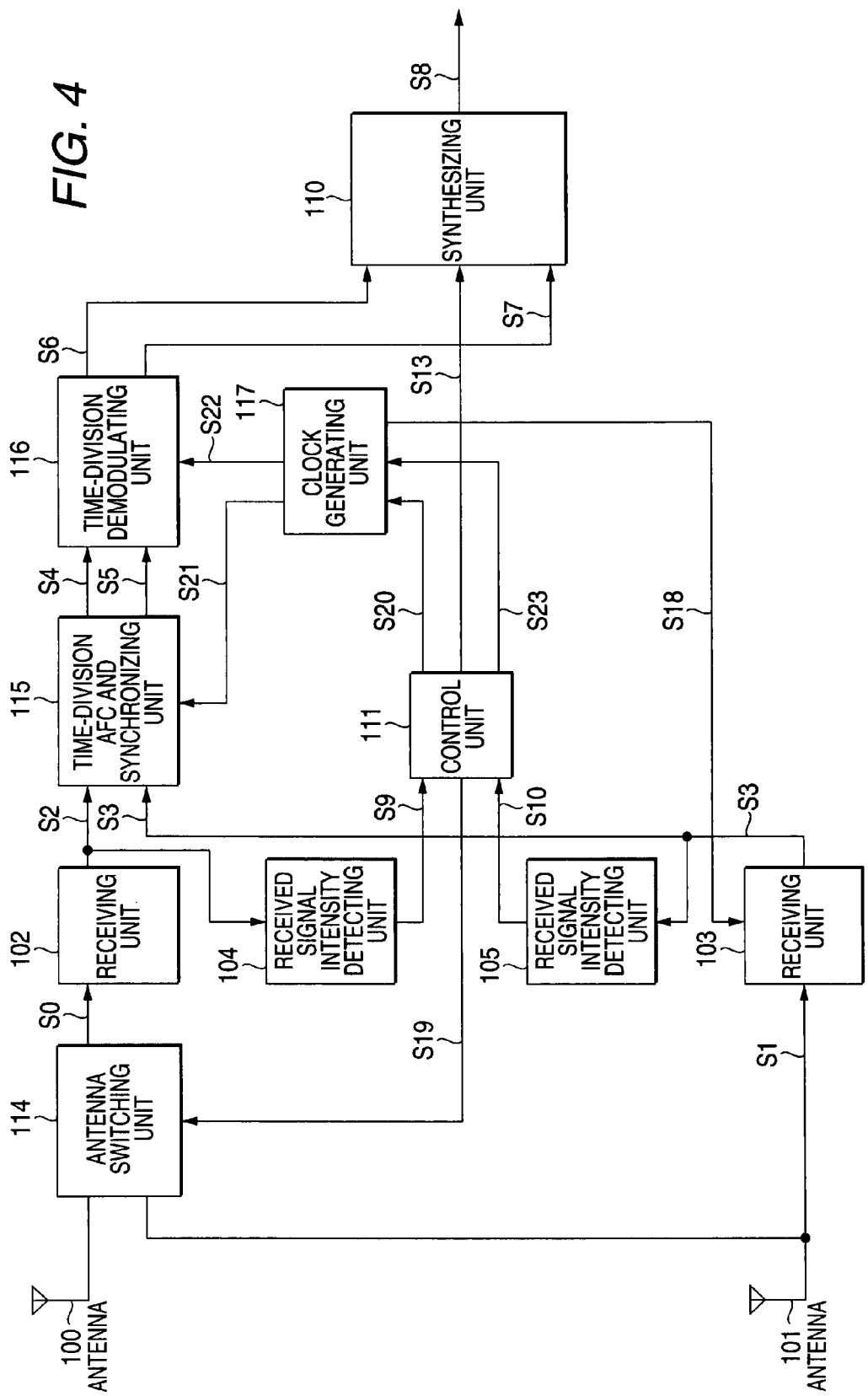
FIG. 4 is a block diagram showing the configuration of a diversity receiving device according to a fourth embodiment of the invention.

FIG. 4 is a block diagram showing the configuration of a diversity receiving device according to a fourth embodiment of the invention. In FIG. 4, an antenna switching unit 114 is added to the configuration of the third embodiment shown in FIG. 3. Hereinafter, only a difference from the third embodiment will be described.

Like the second embodiment, the antenna switching unit 114 selects one of signals coming into two of the antennas 100 and 101 on the basis of the antenna selection signal S19. In addition, the antenna switching unit 114 outputs the selected signal as a received signal S0 to the receiving unit 102.

The control unit 111 receives the reception intensity detection signals S9 and S10 and outputs a clock period control signal S20, a clock interruption control signal S23, a synthesis pattern selection signal S13 for synthesis pattern selection, and an antenna selection signal S19 according to the reception intensity detection signals S9 and S10.

The clock generating unit 117 switches a clock period according to the clock period control signal S20 and outputs an AFC and synchronizing unit clock S21 and a demodulating unit clock S22. Further, the clock generating unit 117 interrupts the supply of the receiving unit clock S18 of the second system, depending on whether the clock interruption control signal S23 is invalid or valid. Except for the above-described configuration, the configuration of the fourth embodiment is the same as the third embodiment.

In this embodiment, the AFC and synchronizing unit 115 performing a time division processing and the demodulating unit 116 performing a time division processing are set to operate at 20 MHz when the processing of one system is performed at 40 MHz and when the processing corresponding to two systems are processed in a time-division manner, like the third embodiment.

Hereinafter, the operations of the respective units will be described in detail. When the reception operation is initiated, the antenna switching unit 114 is set to select the antenna 100 at all times. Then, the receiving unit 102 converts a signal S0 received by the antenna 100 into a baseband received signal S2 and outputs the converted signal. Further, the receiving unit 103 converts a signal S1 received by the antenna 101 into a baseband received signal S3 and outputs the converted signal.

In the control unit 111, a first threshold value for comparison with the reception intensity detection signals S9 and S10 and a second threshold value for comparison with a difference between the reception intensity detection signals S9 and S10 can be set to arbitrary values, like the third embodiment. The first threshold value is set to a value having reception intensity at which reception can be sufficiently performed according to a system.

FIG. 16 shows examples of synthesis pattern selection to be performed by the comparison result of the reception intensity detection signals S9 and S10 with respect to the first threshold value and the comparison result of the difference between the reception intensity detection signals S9 and S10 with respect to the second threshold value, like the second embodiment. Except for a case where both the reception intensity detection signals S9 and S10 exceed the first threshold value, the selection operation of a synthesis pattern is performed in the same manner as the third embodiment.

When both the reception intensity detection signals S9 and S10 exceed the first threshold value, the reception intensity is judged as reception intensity at which reception can be performed by two systems, regardless of the comparison result of the difference between the reception intensity detection signals S9 and S10 with respect to the second threshold value. The antenna switching unit 114 switches an antenna such that the antenna selection synthesis diversity is set.

At this time, the control unit 111 controls the antenna switching unit 114 such that the system having larger reception intensity is selected by the antenna selection signal S19. In addition, the control unit 111 performs the selection synthesis where the demodulation signal S6 output from the demodulating unit 108 is always selected as synthesis pattern selection.

For example, when the reception intensity detection signal S10 is larger than the reception intensity detection signal S9, the antenna switching unit 114 is controlled such that the antenna 101 of the system detecting the reception intensity detection signal S10 is selected by the antenna selection signal S19. Further, the clock period control signal S20 of the AFC and synchronizing unit 115 and the demodulating unit 116 is controlled to be set to 20 MHz, the clock generating unit 17 generates a clock of 20 MHz, and the generation of the receiving unit clock S18 of the second system is interrupted.

Accordingly, the clock of the receiving unit to be converted from a high frequency into a baseband signal having high power consumption in a wireless system can be interrupted. Therefore, it is possible to further reduce power consumption without degrading reception performance. In addition, after an antenna selection synthesis diversity is selected, the reception intensity is the same as the second embodiment.

As described above, the clock generation control and the synthesis pattern selection of the respective systems are performed according to the reception intensity detection signals of the systems and the difference between the reception intensity detection signals, which makes it possible to reduce power consumption without degrading reception performance.

Fifth Embodiment

Figure 5:
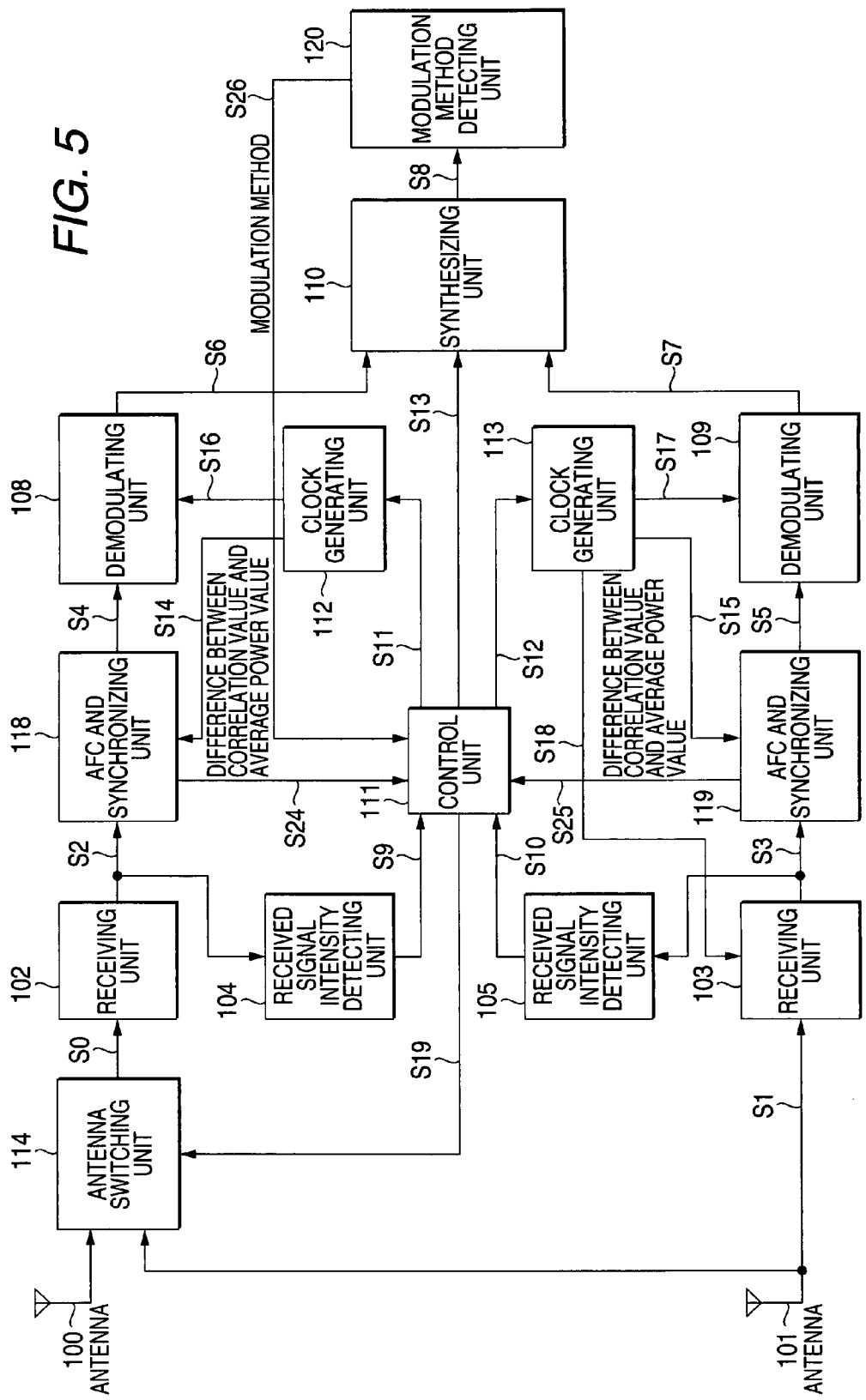
FIG. 5 is a block diagram showing the configuration of a diversity receiving device according to a fifth embodiment of the invention.

FIG. 5 is a block diagram showing the configuration of a diversity receiving device according to a fifth embodiment of the invention. In FIG. 5, the AFC and synchronizing units 106 and 107 are substituted with AFC and synchronizing units 118 and 119, and a modulation method detecting unit 120 is added to the configuration of the second embodiment shown in FIG. 2. Hereinafter, only a difference from the second embodiment will be described.

The AFC and synchronizing units 118 and 119 receive baseband signals S2 and S3 so as to perform an AFC processing and a symbol synchronization detection processing, respectively. In addition to the processed received signals S4 and S5, the AFC and synchronizing units 118 and 119 outputs difference signals S24 and S25 between a correlation detection signal and average power, respectively.

Figure 7:
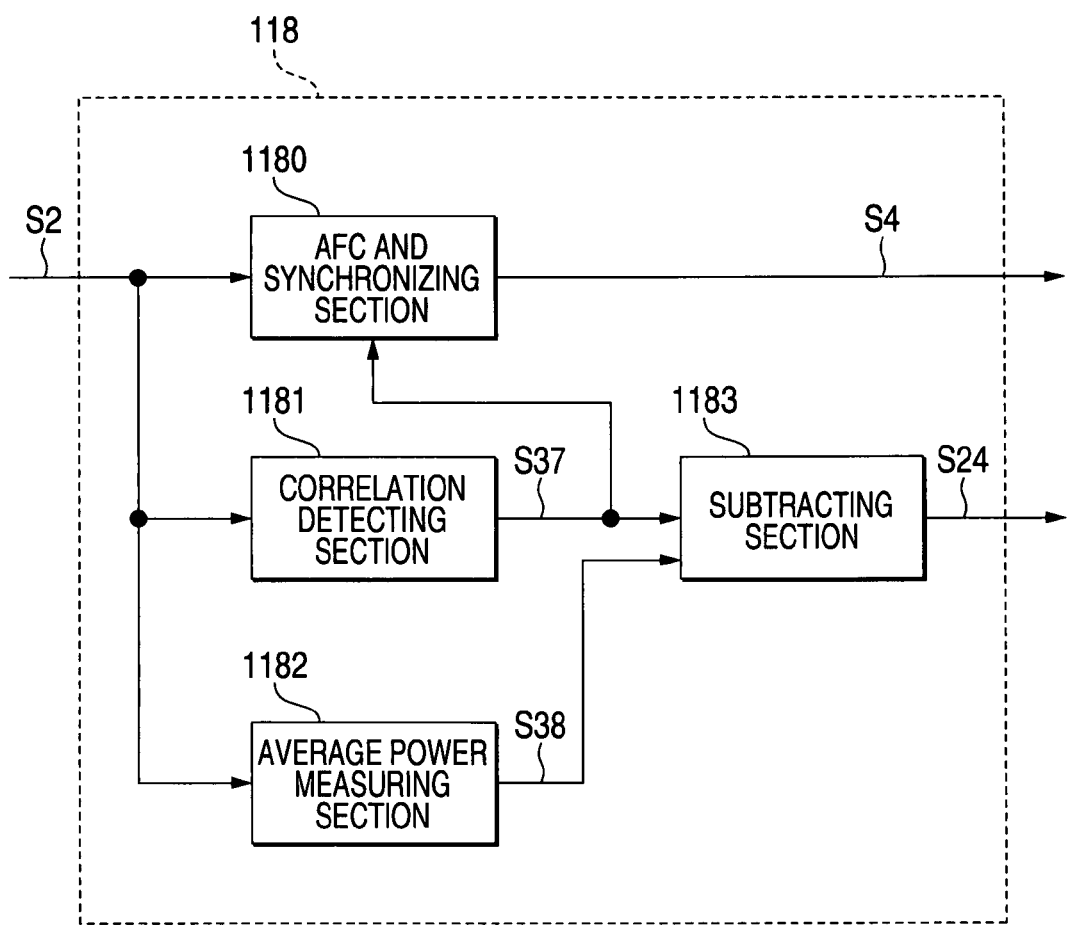
FIG. 7 is a block diagram showing the configuration of an AFC and synchronizing unit in the diversity receiving device according to the fifth embodiment of the invention.

FIG. 7 shows the configuration of the AFC and synchronizing unit 118. In FIG. 7, reference numeral 1180 denotes an AFC and synchronizing section, reference numeral 1181 denotes a correlation detecting section, reference numeral 1182 denotes an average-power measuring section, and reference numeral 1183 denotes a subtracting section.

The correlation detecting section 1181 detects the correlation using a preamble having known signals, and the AFC and synchronizing unit 1180 performs the AFC processing and the symbol synchronization processing according to the correlation detection signal S37. The AFC and synchronizing unit 119 has the same configuration.

Figure 8:
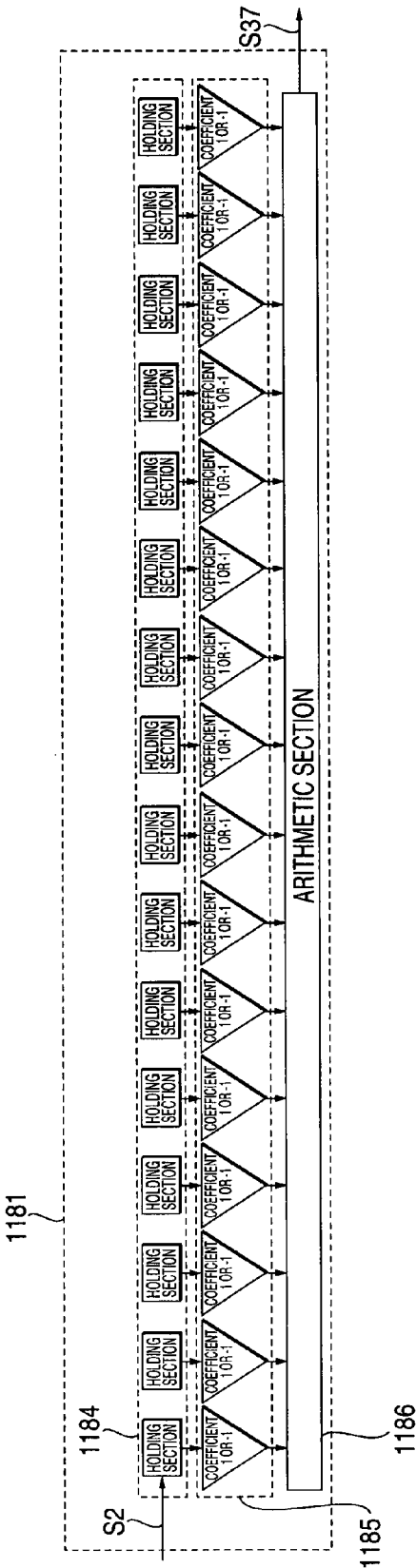
FIG. 8 is a block diagram showing the configuration of a correlation detecting unit in the diversity receiving device according to the fifth embodiment of the invention.

FIG. 8 shows the detailed configuration of the correlation detecting section 1181. This example shows a case where a preamble has 16 samples of known signals.

FIG. 9A shows the relationship between a correlation value and average power when a preamble is ideal, and FIG. 9B shows the relationship between a correlation value and average power when there is a distortion. As shown in FIGS. 9A and 9B, the difference between the correlation value and average power when the preamble is ideal is larger than that when there is a distortion. With this configuration, the difference signal S24 between the correlation value and average power is output as a signal for detecting signal distortion.

The control unit 111 receives the reception intensity detection signals S9 and S10 and the difference signals S24 and S25 between the correlation value and average power and outputs clock interruption control signals S11 and S12 according to the reception intensity detection signals S9 and S10 and the difference signals S24 and S25 between the correlation value and average power. Further, the control unit 111 outputs a synthesis pattern selection signal S13 for synthesis pattern selection and an antenna selection signal S19. Except for the above-described configuration, the configuration of the fifth embodiment is the same as the second embodiment.

Hereinafter, the operations of the respective units will be described in detail. When the reception operation is initiated, the antenna switching unit 114 always selects the antenna 100. Then, the receiving unit 102 converts the signal S0 received by the antenna 100 into a baseband received signal S2 and outputs the converted signal. In addition, the receiving unit 103 converts the signal S1 received by the antenna 101 into a baseband received signal S3 and outputs the converted signal.

In the control unit 111, a first threshold value for comparison with the reception intensity detection signals S9 and S10 and a second threshold value for comparison with a difference between the reception intensity detection signals S9 and S10 can be set to arbitrary values, like the second embodiment. The first threshold value is set to a value having reception intensity at which reception can be sufficiently performed according to a system.

FIG. 17 shows examples of synthesis pattern selection to be performed by the comparison result of the reception intensity detection signal S9 and S10 with respect to the first threshold value and the comparison result of the difference between the reception intensity detection signals S9 and S10 with respect to the second threshold value, like the first embodiment. Except for a case where both the reception intensity detection signals S9 and S10 exceed the first threshold value, the selection operation of a synthesis pattern to be performed is the same as the second embodiment.

When both the reception intensity detection signals S9 and S10 exceed the first threshold value, the reception intensity is judged as reception intensity at which reception can be performed by two systems, and the antenna switching unit 114 switches an antenna such that the antenna selection synthesis diversity is set.

At this time, when the difference between the reception intensity detection signals S9 and S10 with respect to the second threshold value is large, the control unit 111 controls the antenna switching unit 114 through the antenna selection signal S19 such that the system having larger reception intensity is selected. Further, when there is no difference in reception intensity, the control unit 111 controls the antenna switching unit 114 through the antenna selection signal S19 so as to select the system in which the difference signals S24 and S25 between the correlation detection value and average power are large, that is, the system in which the received signal is rarely distorted. In addition, the control unit 111 performs the selection synthesis where a demodulation signal S6 output from the demodulating unit 108 is always selected as synthesis pattern selection.

For example, when the difference signal S25 between the correlation value and average power is larger than the difference signal S24, the control unit 111 controls the antenna switching unit 114 such that the antenna 101 of the system detecting the difference signal S25 is selected by the antenna selection signal S19. Further, the clock interruption control signal S11 is invalidated for the AFC and synchronizing unit 118 and the demodulating unit 108, and the clock interruption control signal S12 is validated for the receiving unit 103, the AFC and synchronizing unit 119, and the demodulating unit 109. Then, the clock generation in the clock generating unit 112 is performed, and the generation of the receiving unit clock S18, the AFC and synchronizing unit clock S15, and the demodulating unit clock S17 in the clock generating unit 113 is interrupted.

Accordingly, the clock of the receiving unit to be converted from a high frequency into a baseband signal having high power consumption in a wireless system can be interrupted. Therefore, it is possible to further reduce power consumption without degrading reception performance. In addition, after the antenna selection synthesis diversity is selected, the reception intensity is the same as the second embodiment.

Except that the selection control of the clocks and synthesis patterns of the respective systems is performed according to the reception intensity detection signals S9 and S10 and the difference signals S24 and S25 between the correlation value and average power, the selection control of the clocks and synthesis patterns of the respective systems can be performed depending on a modulation method in this embodiment.

Here, the modulation method is set to any one of BPSK, QPSK, 16-QAM, and 64-QAM. Typically, a modulation method is added as information into a received signal. Information S26 of the modulation method is fetched by the modulation method detecting unit 120, and the selection control of the clocks and synthesis patterns of the respective systems is performed by the control unit 111 according to the modulation method.

In general, it is known that the addition synthesis diversity has an effect as much as a multi-valued (16-QAM and 64-QAM) modulation method. Accordingly, in case of a modulation method, such as 64-QAM or 16-QAM, the addition synthesis is performed regardless of the reception intensity detection signals S9 and S10 and the difference signals S24 and S25 between the correlation value and average power. In case of a modulation method of BPSK or QPSK, the above-described selection control of the clocks and synthesis patterns of the respective systems is performed according to the reception intensity detection signals S9 and S10 and the difference signals S24 and S25 between the correlation value and average power.

As described above, the clock generation and synthesis pattern selection of the respective systems are performed according to the reception intensity detection signals of the systems, the difference between the reception intensity detection signals, the difference signals between the correlation value and average power, and the modulation method, which makes it possible to reduce power consumption without degrading reception performance.

In this embodiment, the AFC and synchronizing unit 115 performing the time division processing and the demodulating unit 116 performing the time division processing may be used, as described in the third and fourth embodiments. Further, the difference signals S25 and S24 between the correlation value and average power in this embodiment may be compared with an arbitrary threshold value.

Sixth Embodiment

Figure 6:
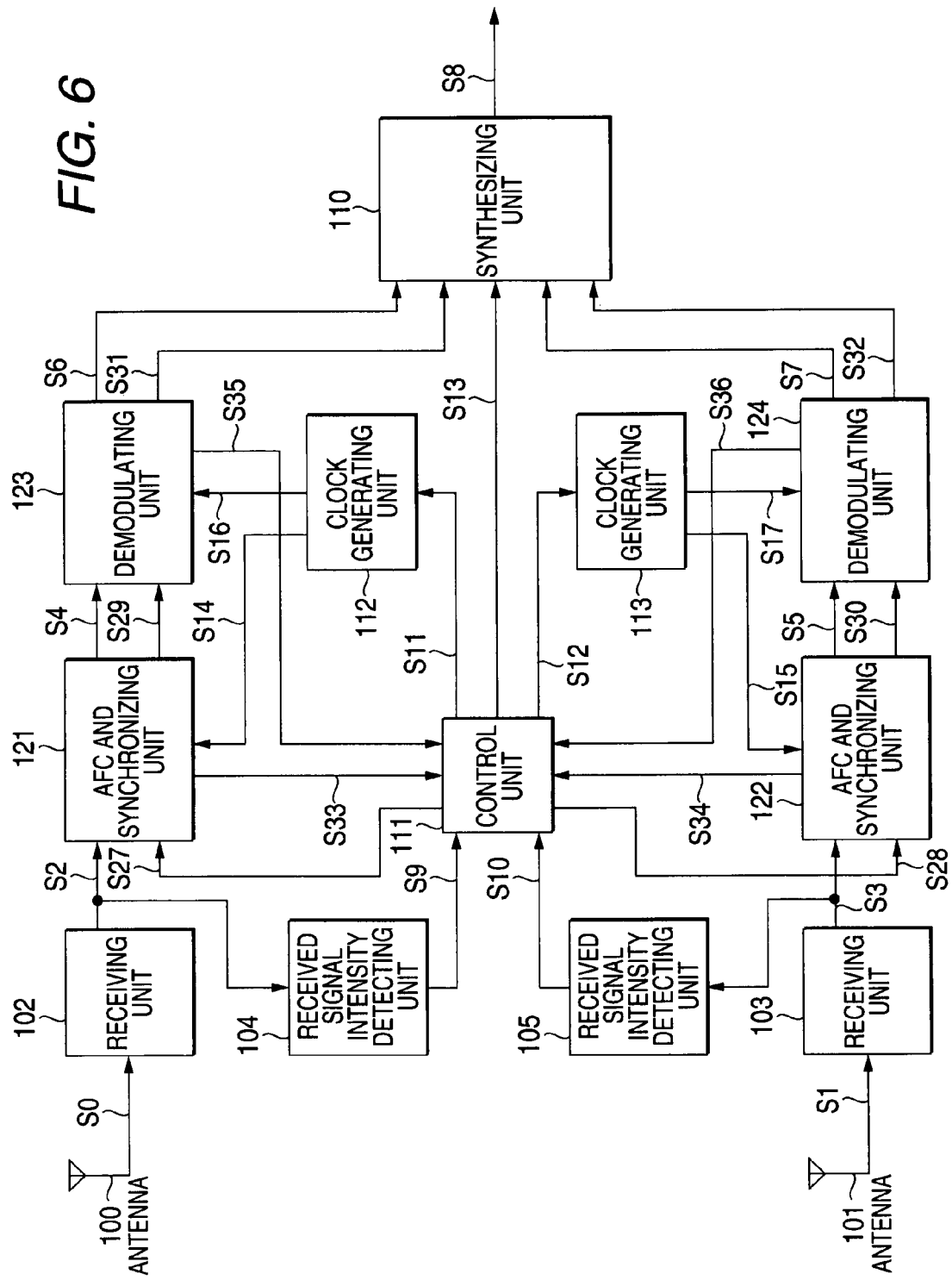
FIG. 6 is a block diagram showing the configuration of a diversity receiving device according to a sixth embodiment of the invention.

FIG. 6 is a block diagram showing the configuration of a diversity receiving device according to a sixth embodiment of the invention. In FIG. 6, the AFC and synchronizing units 106 and 107 are substituted with AFC and synchronizing units 121 and 122 and the demodulating units 108 and 109 are substituted with the demodulating units 123 and 124 in the first embodiment shown in FIG. 1. Hereinafter, only a difference from the first embodiment will be described.

In addition to the baseband received signals S2 and S3, the AFC and synchronizing units 121 and 122 receive reception intensity comparison results S27 and S28 to be obtained when the control unit 111 compares the reception intensity detection signals S9 and S10 with a threshold value held therein, respectively. Further, the AFC and synchronizing units 121 and 122 perform the AFC processing and the symbol synchronization detection processing according to the reception intensity comparison results S27 and S28 and then outputs the processed received signals S4 and S5, reception intensity comparison results S29 and S30 corresponding thereto, and clock interruption request signals S33 and S34, respectively.

Figure 10:
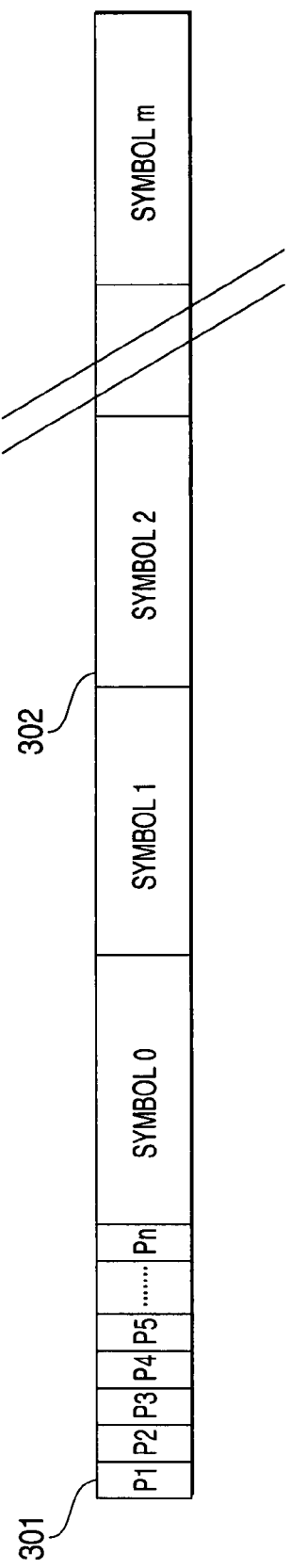
FIG. 10 is a diagram showing the frame configuration of a packet to be received in the diversity receiving device according to the sixth embodiment of the invention.

FIG. 10 shows the frame configuration of a signal to be received. In the frame configuration, a preamble portion 301 is added to the head, and a data portion 302 has symbols.

Figure 11:
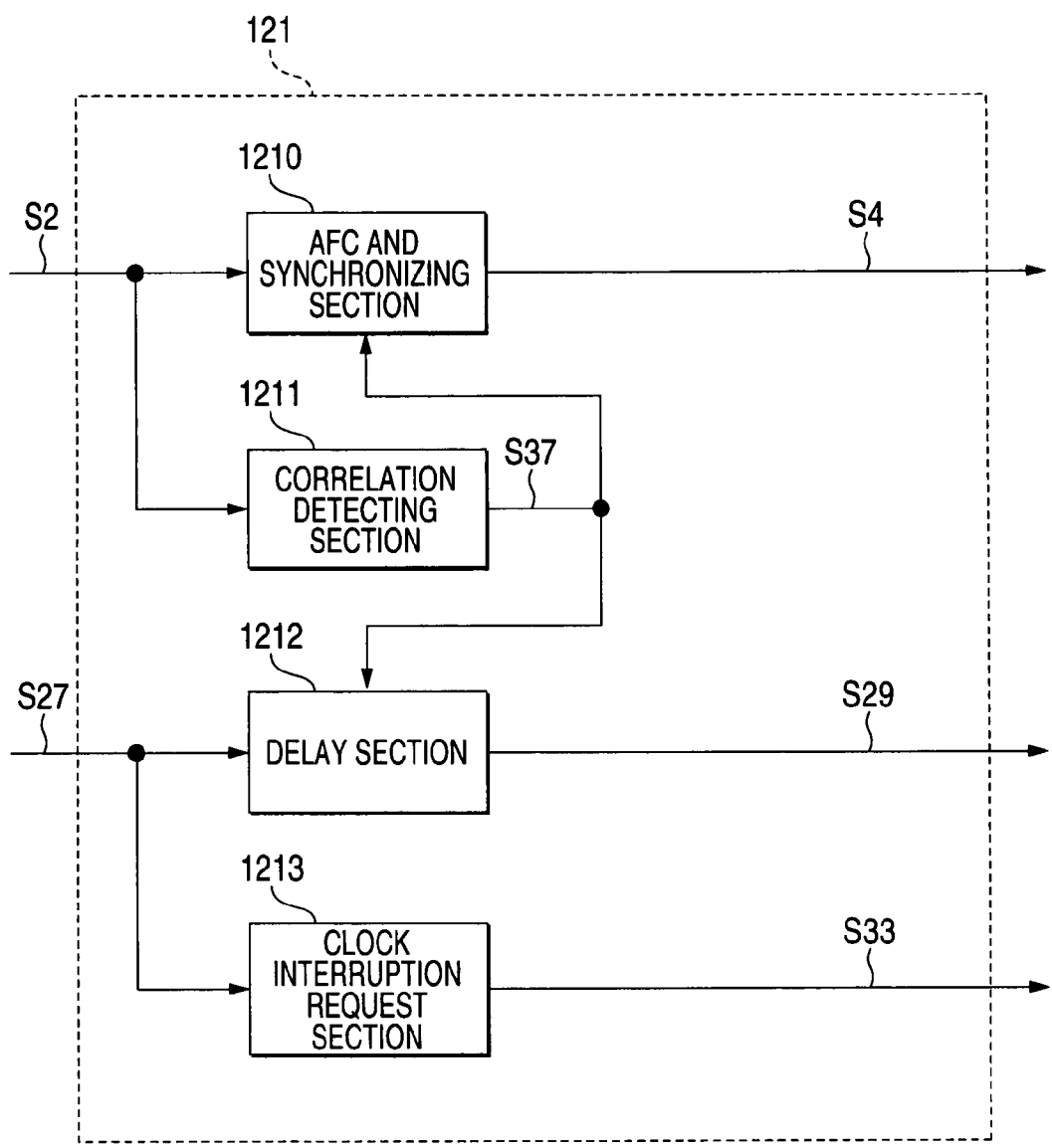
FIG. 11 is a block diagram showing the configuration of an AFC and synchronizing unit in the diversity receiving device according to the sixth embodiment of the invention.

FIG. 11 shows the configuration of the AFC and synchronizing unit 121. In FIG. 11, reference numeral 1210 denotes an AFC and synchronizing section, reference numeral 1211 denotes a correlation detecting section, reference numeral 1212 denotes a delay section, and reference numeral 1213 denotes a clock request section.

The correlation detecting section 1211 detects a correlation using a preamble having known signals. Then, the AFC and synchronizing section 1210 performs the AFC processing and the symbol synchronization processing so as to detect a symbol from the correlation detection signal S37.

The delay section 1212 determines the reception intensity comparison result S27 at a timing of the correlation detection signal S37, delays the result as much as the AFC processing and symbol synchronization processing are performed, and outputs the delayed result as the reception intensity comparison result S29 according to a timing of the processed received signal S4. Accordingly, the reception intensity comparison result S29 does not change in a symbol but changes in terms of symbols.

The clock request section 1213 validates a clock interruption request signal S33 when the reception intensity comparison result S27 is low. Further, the clock request section 1213 invalidates a clock interruption request signal S29 when the reception intensity comparison result S27 is high. The configuration of the AFC and synchronizing unit 122 is the same as the AFC and synchronizing unit 121.

The demodulating units 123 and 124 receive the reception intensity comparison results S29 and S30 as well as the received signals S4 and S5 subjected to the AFC processing and symbol synchronization detection processing, respectively. Further, the demodulating units 123 and 124 perform demodulation according to the reception intensity comparison results S29 and S30 and output the processed demodulation signals S6 and S7, the reception intensity comparison results S31 and S32 corresponding thereto, and the clock interruption request signals S35 and S36, respectively.

Figure 12:
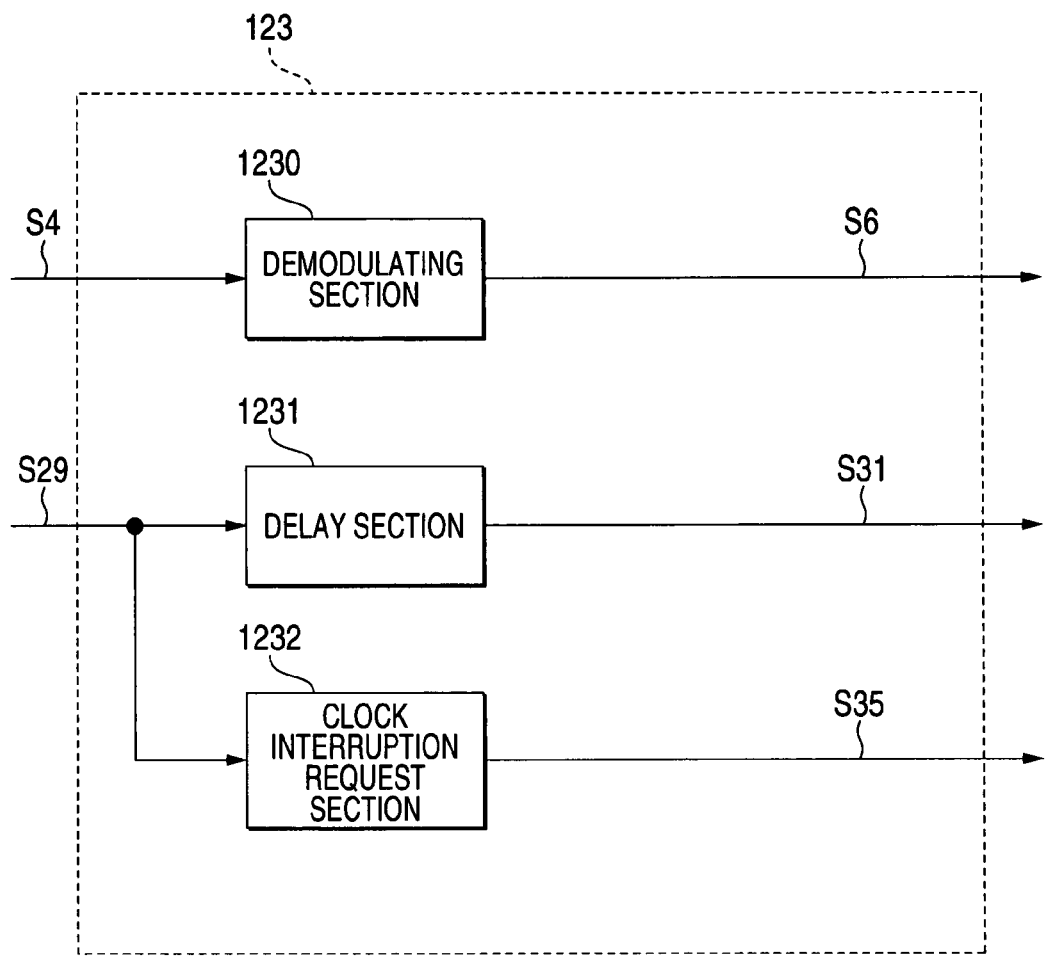
FIG. 12 a block diagram showing the configuration of a demodulating unit in the diversity receiving device according to the sixth embodiment of the invention.

FIG. 12 shows the configuration of the demodulating unit 123. In FIG. 12, reference numeral 1230 denotes a demodulating section, reference numeral 1231 denotes a delay section, and reference numeral 1232 denotes a clock request section. The delay section 1231 delays the reception intensity comparison result S29 as much as demodulation is performed and then outputs the delayed result as the reception intensity comparison result S31.

The clock request section 1232 validates the clock interruption request signal S35 when the reception intensity comparison result S29 is low. Further, the clock request section 1232 invalidates the clock interruption request signal S35 when the reception intensity comparison result S29 is high. The configuration of the demodulating unit 123 is the same as the demodulating unit 124.

The control unit 111 receives the reception intensity detection signals S9 and S10 and the clock interruption request signals S33, S34, S35, and S36. Further, the control unit 111 outputs the reception intensity comparison results S27 and S28 obtained through the comparison between the reception intensity detection signals S9 and S10 and a threshold value held therein, and the clock interruption control signals S11 and S12 according to the clock interruption request signals S33, S34, S35, and S36.

The synthesizing unit 110 selects a synthesis pattern according to an input synthesis pattern selection signal S13 and the reception intensity comparison results S31 and S32 and synthesizes the demodulation signals S6 and S7 so as to output a synthesized modulation signals S8. Here, any one of the selection synthesis diversity for selecting one of the modulation signals S6 and S7 and the addition synthesis diversity for adding the modulation signals S6 and S7 is selected as a synthesis pattern. Except for the above-described configuration, the configuration of the sixth embodiment is the same as the first embodiment.

As described above, the processed signals of the respective units and the reception intensity comparison results corresponding to the processing signals are output, and the clock interruption request signals S33, S34, S35, and S36 are output from the respective units according to the reception intensity comparison results. Then, the control unit 111 can control clocks without considering a processing delay of the respective units. As a result, the control can be simplified.

Figure 13:
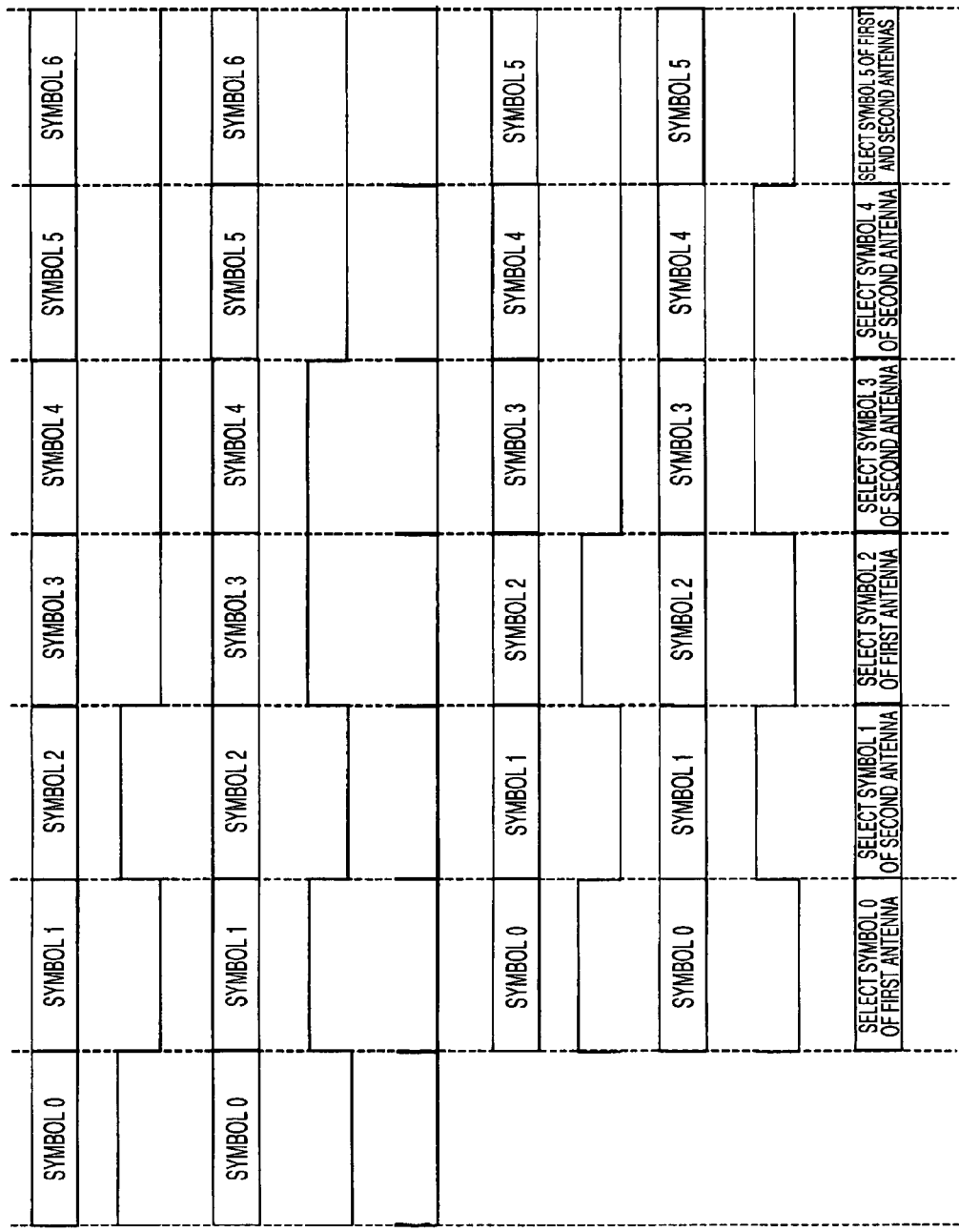
FIG. 13 is a timing chart illustrating the operation of the diversity receiving device according to the sixth embodiment of the invention.
Figure 14:
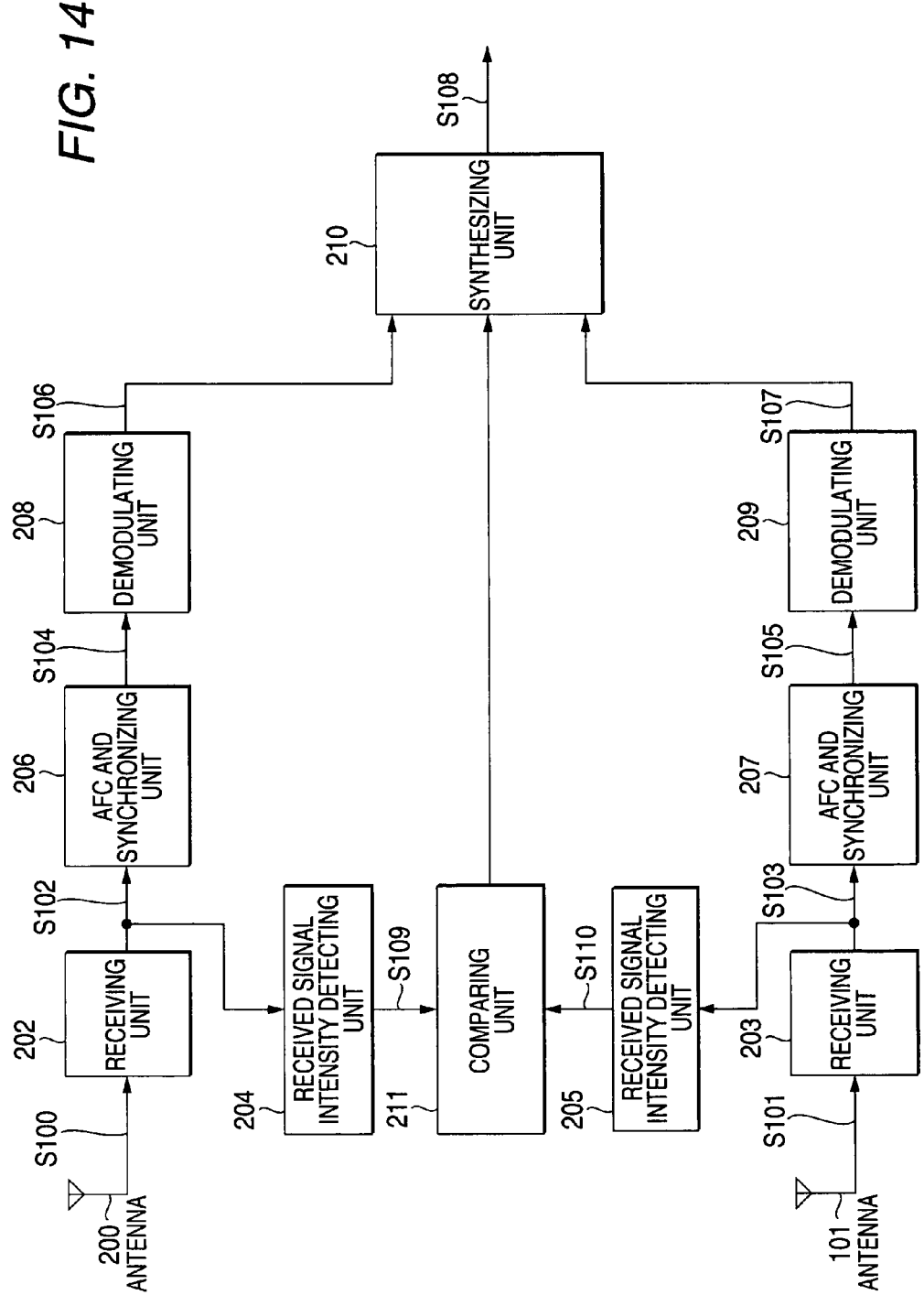
FIG. 14 is a block diagram showing the configuration of a known diversity receiving device.

FIG. 13 is a timing chart illustrating the operation of the diversity receiving device according to this embodiment. Hereinafter, the operations of the respective units in this embodiment will be described in detail with reference to FIG. 13.

In the control unit 111, an arbitrary threshold value can be set for comparison with the reception intensity detection signals S9 and S10. The control unit 111 outputs high when the reception intensity detection signals S9 and S10 as the reception intensity comparison results S27 and S28 are equal to or more than the threshold value, and outputs low when the reception intensity detection signals S9 and S10 are less than the threshold value. The arbitrary threshold value for comparison with the reception intensity is set to a value having reception intensity at which reception can be performed according to systems.

As shown in FIG. 13, the reception intensity comparison results S27 and S28 are judged for each correlation detection signal S37. Therefore, there is no change in one symbol. In case of processing of a symbol 0, only the first system outputs high, such that the selection synthesis diversity for selecting a demodulation signal of the first system is set. Further, the clock interruption request signals S34 and S36 are output from the AFC and synchronizing unit 122 and the demodulating unit 124 of the second system, and the control unit 111 interrupts the clocks of the AFC and synchronizing unit 122 and the demodulating unit 124 of the second system.

In case of processing of a symbol 1, only the second system outputs high, such that the selection synthesis diversity for selecting a demodulation signal of the second system is set. Further, the clock interruption request signals S33 and S35 are output from the AFC and synchronizing unit 121 and the demodulating unit 123 of the first system, and the control unit 111 interrupts the clocks of the AFC and synchronizing unit 121 and the demodulating unit 123 of the first system.

In case of a symbol 5, both the systems output low. In this case, even though the clock interruption request signals S33 and S34 or S35 and S36 are validated for two systems, the control unit 111 regards the signals to be invalid and generates a clock, such that the addition synthesis diversity for adding the demodulation signals S6 and S7 is selected.

As described above, the clock generation control and the synthesis pattern selection of the respective systems are performed for each symbol according to the comparison between the received signal intensities of the respective systems and the threshold value held by the control unit 111. Accordingly, even in a system, such as a high-speed mobile or the like, it is possible to reduce power consumption without degrading reception performance.

The control unit 111 invalidates the AFC and synchronization clock interruption request signals S33 and S34 and the demodulation clock interruption request signals S35 and S36 depending on external setting signals. Further, the control unit 111 outputs the clock control signals S11 and S12 and the synthesis pattern selection signal S13 according to the reception intensity detection signals S9 and S10, thereby performing switching of this embodiment and the first embodiment. Further, the configuration of this embodiment may be replaced by an embodiment performing a time division processing of the third embodiment. Further, the external setting signals may be signals that are set according to a transfer rate or other signals.

In the diversity receiving device of the invention, the power supply into systems other than a selected system is interrupted, and thus it is possible to reduce overall power consumption without degrading reception performance. Further, the diversity receiving device can be used as a diversity receiving device that selects at least one received signal from a plurality of systems.

What is claimed is:

1. A diversity receiving device that selects at least one of a plurality of received signals, the diversity receiving device comprising:
    a plurality of receiving units, each of which is configured to convert one of the plurality of received signals into a baseband signal;
    a demodulating unit configured to demodulate the baseband signal into a demodulated signal;
    a clock generating unit configured to generate a clock signal; and
    a control unit configured to control the clock generating unit, wherein:
    the control unit selects the at least one of plurality of received signals,
    the control unit controls the clock generating unit to interrupt clock generation to one of the plurality of receiving units, which converts one of the plurality of received signals other than the at least one of the plurality of received signals, and
    the diversity receiving device further comprises
    a synthesizing unit configured to synthesize the demodulated signal and outputs a synthesized demodulation signal, wherein the control unit controls the synthesizing unit to output either selection synthesis diversity or addition synthesis diversity according to intensity of the at least one of the plurality of received signals.

2. The diversity receiving device according to claim 1, wherein the control unit controls the synthesizing unit to output either selection synthesis diversity or addition synthesis diversity according to a difference between the largest intensity and the second-largest intensity among the plurality of received signals.

3. The diversity receiving device according to claim 1, further comprising:
    a unit that selects a received signal from the plurality of received signals in which a difference between a correlation value of the plurality of received signals and average power of the plurality of received signals is the largest.

4. The diversity receiving device according to claim 1, further comprising:
    a unit that selects the selection synthesis diversity or the addition synthesis diversity on the basis of a modulation method of a synthesized received signal.

5. The diversity receiving device according to claim 1, further comprising:
    a unit that delays a signal indicating line quality judged on the basis of the intensity of the one of the plurality of received signals by a processing time of each system in synchronization with symbol detection of the one of the plurality of received signals; and
    a unit that selects the selection synthesis diversity or the addition synthesis diversity on the basis of the line quality.

6. The diversity receiving device according to claim 1, further comprising:
    a unit that selects at least one received signal from the plurality of received signals on the basis of an instruction from the outside.

7. The diversity receiving device according to claim 1, further comprising:
    a unit that selects the selection synthesis diversity or the addition synthesis diversity on the basis of an instruction from the outside.

* * * * *